United States Patent
Edmondson et al.

(10) Patent No.: US 7,076,464 B2
(45) Date of Patent: Jul. 11, 2006

(54) APPARATUS, AND ASSOCIATED METHOD, FOR DISTRIBUTING REVENUE GENERATED PURSUANT TO DISTRIBUTION OF CONTENT

(75) Inventors: David J. Edmondson, Southlake, TX (US); Mark C. Hill, Fort Worth, TX (US)

(73) Assignee: RadioShack Corporation, Fort Worth, TX (US)

( * ) Notice: Subject to any disclaimer, the term of this patent is extended or adjusted under 35 U.S.C. 154(b) by 0 days.

(21) Appl. No.: 10/839,636

(22) Filed: May 5, 2004

(65) Prior Publication Data

US 2005/0125165 A1     Jun. 9, 2005

Related U.S. Application Data

(60) Provisional application No. 60/527,070, filed on Dec. 4, 2003.

(51) Int. Cl.
*G06F 15/00* (2006.01)
*G06F 17/40* (2006.01)

(52) U.S. Cl. .............................. 705/39; 705/1; 705/52; 705/80; 702/52; 395/701; 709/217; 713/193

(58) Field of Classification Search .................... 705/1, 705/52, 80, 39; 702/52; 395/701; 709/217; 713/193
See application file for complete search history.

(56) References Cited

U.S. PATENT DOCUMENTS 5,819,092 A * 10/1998 Ferguson et al. ............ 717/113
5,910,987 A *  6/1999 Ginter et al. ................. 705/52

FOREIGN PATENT DOCUMENTS

JP          02002366797 A  * 12/2002

OTHER PUBLICATIONS

In Recognition of retail vision. (Retail Entrepreneurs of the Year) Chain Store Age, vol.: 79, No.: 12, p.: 57(22), Dec. 2003.*

* cited by examiner

*Primary Examiner*—James P Trammell
*Assistant Examiner*—Daniel L. Greene
(74) *Attorney, Agent, or Firm*—David Matthews

(57) ABSTRACT

Apparatus, and an associated method, for facilitating distribution of revenue generated pursuant to distribution of content, such as recorded music files or other entertainment files, to content consumers. Identification is made by an identifier of includable distribution entities that are includable in distributions of revenue derived as a result of downloading content to content consumers. A revenue allocator allocates revenues to the includable distribution entities according to a selected formula. The selected formula is dynamically alterable, depending upon demand indications, as well as other criteria.

5 Claims, 2 Drawing Sheets

APPARATUS, AND ASSOCIATED METHOD, FOR DISTRIBUTING REVENUE GENERATED PURSUANT TO DISTRIBUTION OF CONTENT

CROSS-REFERENCE TO RELATED APPLICATIONS

The present invention claims the priority of Provisional Patent Application No. 60/527,070, filed on Dec. 4, 2003, the contents of which are incorporated herein by reference.

The present invention relates generally to a manner by which to allocate revenues generated responsive to distribution of content, such as musical or entertainment recordings, to consumers of the content. More particularly, the present invention relates to apparatus, and an associated method, by which dynamically to allocate to what entities, and in what proportionate shares, the revenue generated as a result of payment by the content consumers for the distribution of the content. Identification is made as to which entities shall form includable entries that are permitted to share in the distribution. And, proportionate shares, derived pursuant to a proportionality scheme, define in what proportion that the includable entities shall share in the revenue.

An efficient and quantitative allocation mechanism is provided. Distribution of the content is made from a content depository by way of any selected distribution mechanism. As the distribution chain is effectively free of "middlemen", increased proportions of the revenue are available for allocation to the content creators and performers, all according to the proportionality scheme.

BACKGROUND OF THE INVENTION

Musical, and other, entertainment is a large industry. And, many business segments of the industry are significant revenue generators providing significant revenues and profits to the owners and operators of the businesses associated with the business segments.

Large numbers of consumers, for instance, purchase, or otherwise subscribe, to services to receive musical, and other, entertainment content. An economically-significant distribution system is well entrenched and involves all aspects of the industry, extending from the creation of the content to its ultimate delivery to the consumer. While the distribution system is essential to the supply of the content to the ultimate consumer, the entrenched nature of the conventional distribution system has not taken full advantage of technological advancements that could increase efficiencies of its operation. And, perhaps due to the vested interests of certain portions of the owners and operators of businesses associated with the industry and its continuation in its present form, significant changes that are permitted as a result of technological advancements in technologies have not been implemented in an integrated manner to increase the efficiencies of the distribution of the musical, and other, content.

Many technological advancements in digital, and other, communication technologies, for instance, have permitted the development and deployment of new types of communication systems. New types of communication systems provide for the effectuation, for instance, of new types of communication services, some of which had been previously unavailable or prohibitively expensive to implement.

Most generally, a communication system provides for the communication of data between a set of communication stations, thereby to permit the effectuation of a communication service. Some communication services permitted by way of some communication systems provide for the delivery of content to a consumer. Business content, entertainment content, and other types of content are delivered to a consumer by way of a communication system. A communication station forming a content source communicates the content by way of a communication channel to another communication station, forming a content destination. Subsequent to delivery of the content to the content destination, the content is converted into a form that is viewable, e.g., visually or audially, by the consumer.

In wireline communication systems, the communication channels upon which the content is communicated are defined upon wireline connections interconnecting the content source and the content destination. And, in radio communication systems, the communication channels upon which the content is communicated are defined upon radio channels, formed of portions of the electromagnetic spectrum. End-to-end communication of content is sometimes effectuated by way of both wireline and radio communication systems in which a portion of the communication path extending between the content source and content destination is formed of a wireline communication system and another portion of the communication path is formed of a radio communication system.

A telephonic communication system is an exemplary, conventional, wireline communication system that provides for the communication of content between content sources and content destinations. And, the Internet backbone is also exemplary of a communication system that provides for the communication of content between content sources and destinations. The Internet backbone permits the formation of relatively large bandwidth connections, and the use of the Internet backbone through which to communicate content permits relatively large amounts of content to be communicated at relatively high throughput rates.

Conventional, terrestrial radio and television systems and networks are exemplary of conventional, radio communication systems. Satellite-based radio, television, and other broadcast systems and networks are also exemplary of radio communication systems that are used to communicate content. Both terrestrial- and satellite-based radio communication systems provide large-area coverage.

While many different types of communication systems are available through which to communicate content, consumers of content delivered by way of many radio communication systems are by way of service subscriptions for the delivery of broadcasts of content or by way of non-paid systems for the delivery also of broadcast of content.

While such systems, and also wireline-based communication systems, are capable of providing to content consumers content on a more-individualized basis, such services have not been widely provided. And, instead, individualized distribution of content is more regularly carried out by way of conventional distribution systems, generally including retail distribution centers at which individualized content, such as recorded music performed by a particular content performer is made available to the consumer by way of point-of-sale purchase. Because conventional distribution systems generally include a chain of middlemen, a significant portion of the purchase price of the content is allocated to the middlemen of the distribution chain. As various modern communication systems are available to provide distribution of content on an individualized basis, increased efficiencies of content distribution, and the allocation of revenues derived therefrom, is possible. A mechanism by which to facilitate such distribution and allocation of revenues would therefore be advantageous.

It is in light of this background information related to the distribution of content to a consumer thereof that the significant improvements of the present invention have evolved.

SUMMARY OF THE INVENTION

The present invention, accordingly, advantageously provides apparatus, and an associated method, by which to allocate revenues generated responsive to distribution of content, such as musical or entertainment recordings, to consumers of the content.

Through operation of an embodiment of the present invention, a manner is provided by which dynamically to allocate to what entities, and in what proportionate shares, the revenue generated as a result of payment by the content consumers for the distribution of the content. An identification is made to identify which entities are permitted to share in the distribution of the revenues. Such entities form includable entities, viz., such entities form entities permitted to receive portions of the revenues generated as a result of distribution of recorded content to consumers of the content.

And, once the includable entities are identified, their proportionate shares are assigned. The proportionate shares assigned to each of the includable entities is derived from a proportionality scheme that defines in what manner, i.e., in what proportionate shares, that the individual ones of the includable entities shall receive upon payment of distribution of selected content to selected consumers thereof.

A reduced distribution chain, relative to conventional content distribution systems, is required to distribute the content to the consumers thereof. With reduced numbers of middlemen, and a more efficient distribution scheme, the revenues generated pursuant to distribution to a content consumer of content, at least from the perspective of the content author or performer is more equitably distributable.

In one aspect of the present invention, a content depository is created and maintained at which to store content, formatted, for instance, to form content files. The content files are stored together at a database that is maintained at the content depository. A content consumer requests distribution of selected content files of the content files maintained at the depository. And, upon payment, or pursuant to a payment procedure, the selected content files are distributed responsive to the request. Revenues are generated pursuant to the transaction in which the content is selected, retrieved, and distributed pursuant to the content consumer's request. The collectable revenues are allocated to the includable entities in the proportionate shares defined by the proportionality scheme.

In another aspect of the present invention, a revenue distributor is maintained at the content depository. The revenue distributor receives indications of requests for distribution of content files, and associated payment indicia pursuant to the request and distribution. The revenue determiner determines which entities are includable entities to which a portion of the created revenue is to be allocated. And, the revenue distributor at least initiates effectuation of the distribution of the revenues to the includable entities.

The includable entities are identified by the revenue distributor. The includable entities are selected from a set of possible revenue distribution parties. The possible revenue distribution parties include the author of the content, the performer of the content, the owner or operator of the distribution mechanism by way of which the content is distributed to the content consumer, and the operator of the content database. Additional, possible revenue parties also form part of the set, if desired.

A revenue allocator allocates, to the includable entities, the revenue allocations pursuant to a proportionality scheme. The proportionality scheme, in one implementation, is a dynamically calculable equation in which each of the includable entities is assigned a percentage factor of the generated revenues. The percentage factors of the includable entities sum together for the entire percentage amount, i.e., one hundred percent, of the generated revenues. The percentages assigned to the individual ones of the includable entities are selectably of fixed values or of dynamically selectable values, based upon input indicia. The input indicia, for instance, identifies the indicia associated with the content performer, e.g., the historical popularity of the performer. The indicia, for instance, identifies, by a category of historical popularity, the historical success of the performer. Content performers that have achieved greater levels of historical popularity are assigned, if desired, an increased proportionate share of the generated revenues. The distribution system, e.g., a wireline, Internet-based distribution system, or a satellite-based distribution system, or other distribution system, used by way of which to distribute the content to the content consumer is also selectably used as an input indicia by way of which the revenue allocator selects the proportionate share by which the operator of the distribution system shall share in the generated revenues. Different types of distribution systems have different sets of costs associated therewith, and the distribution of the content by way of the different ones of the distribution mechanisms are, if desired, factors in the allocation of revenues. Demand for the content is also identifiable, and input indicia responsive to which the allocations made by the revenue allocator are adjusted, i.e., dynamically changed. Increased popularity of the content, indicated by requests for distribution thereof, are used, if desired, to reallocate increased proportionate shares to the content author and/or content performer.

In a further aspect of the present invention, once the revenue allocator allocates the proportionate shares of the revenue allocations to the includable entities, indications of the allocations are provided to a payment effectuator that effectuates payment to the includable entities.

Through use of a content depository and distribution systems that provide electronic, or other, distribution of selected content, the content is provided to consumers thereof quickly, and efficiently. And, because the distribution chain effectively removes layers of middlemen, increased distribution efficiency is achieved. Allocation of revenues generated pursuant to the distribution of the content is equitably made, according to any desired allocation scheme.

In these and other aspects, therefore, apparatus, and an associated method, is provided for a content distribution facility. The content distribution facility stores content files that are available for distribution to content consumers. A revenue distributor facilitates distribution of revenue generated pursuant to distribution of the content files to the content consumers. An includable distribution party identifier is adapted to receive indications of identities of at least a first set of possible revenue distribution parties. The includable distribution party identifiers identify which, if any, possible revenue distribution parties form includable distribution parties that are includable in distributions of revenue generated responsive to distribution of selected ones of the content files that are providable to the content consumer. A revenue allocator is adapted to receive indications of the includable distribution parties, if any, identified by the distribution party identifier to be includable in the distributions of the revenue. The revenue allocator is further adapted to receive indications of at least a first selected demand indicia. The revenue allocator allocates amongst the includable distribution parties proportionate shares of the revenue that is generated pursuant to a proportionality scheme. The proportionality scheme is derived, at least in part, by the first selected demand indicia.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
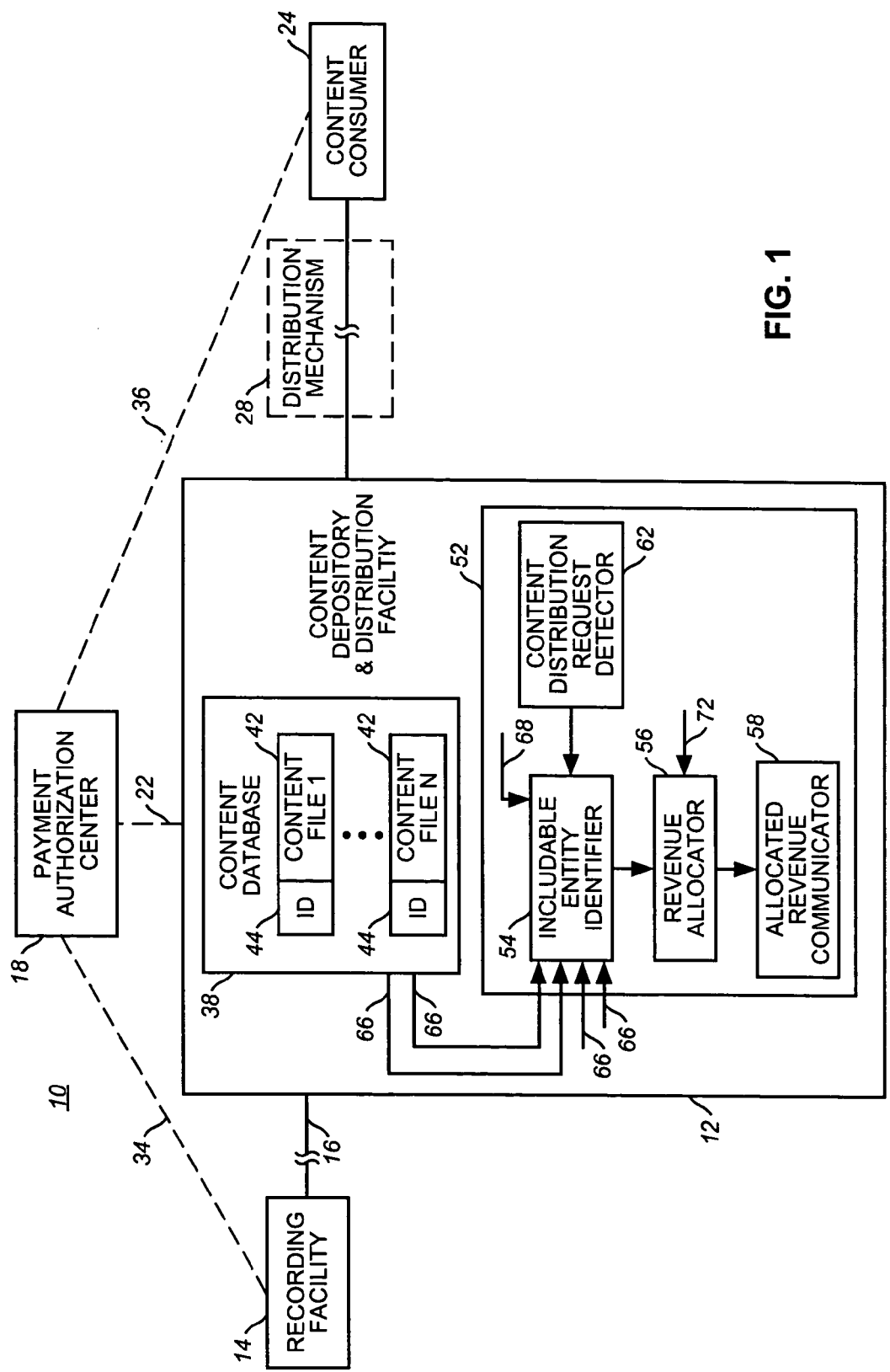
FIG. 1 illustrates a functional block diagram of a content creation and distribution system in which an embodiment of the present invention is operable.

Referring first to FIG. 1, a content creation and distribution system 10 is functionally represented. The system 10 operates to provide for the creation, recordation, storage, and distribution of content to consumers of the content. In the exemplary implementation, various elements of the system are physically implemented at disparate locations, connected by way of appropriate communication mechanisms. In other implementations, various elements of the system, and functional entities thereof are physically co-located or distributed in manners other than those that are shown in FIG. 1. Operation of an embodiment of the present invention can analogously be described with respect to its implementation in systems constructed in other manners. Accordingly, the following description is not by way of limitation, but is exemplary only.

The system 10 includes a content depository and distribution facility 12 that is maintained and operated by a depository facility operator. The facility is maintained in at least selected communication connectivity with recording facilities, such as the recording facility 14, by way of communication lines 16. The content depository and distribution facility is further coupled to a payment authorization center 18, here by way of communication lines 22. And, content consumers 24, representative of consumers of content, are maintained in selected communication connectivity with the facility 12 by way of communication paths 26, here provided by way of selected distribution mechanisms 28. Communication paths also selectably interconnect the recording facility and the content consumers with the payment authorization center. Such connections are represented in the figure by the communication lines 34 and 36. The communication paths that selectably interconnect the various elements of the system are formed by way of any appropriate communication medium, such as the Internet backbone.

The distribution mechanism 28, by way of which the communication paths 26 are formed, is, in the exemplary implementation, selectable. That is to say, a content consumer selects by way of what type of distribution mechanism that the selected content shall be delivered to the consumer. Exemplary distribution mechanisms selectable by the consumer include the Internet backbone, wireless, terrestrial communication systems, and satellite-based wireless communication systems.

The content depository and distribution facility 12 includes a content database 38 that is formed of plurality of content files 42. Each of the content files is identified by a content identifier 44. The content files each define recorded content, such as recorded musical entertainment or other recorded indicia capable of playback at appropriate playback mechanisms.

The content files are, for instance, created at a recording facility, such as the recording facility 14, and uploaded to the content depository and distribution facility for storage at the content database. The content files alternately are created elsewhere and are provided to the content depository and distribution facility by way of any appropriate communication link. In one implementation, the content database is maintained at a computer server that includes appropriate storage capacity for storing a large number of content files at the content database formed therefrom.

The content files, suitably identified and maintained at the content database, are selectably downloadable to a content consumer for playback by the content consumer. During exemplary operation, the content consumer, appropriately authenticated to be permitted access at least to review the identities 44 of the content files, is further selectably permitted to request downloading of one or more selected content files. Copies of the content files are, e.g., available for purchase by a content consumer with payment made to the payment authorization center 18. The payment authorization center is, for instance, a credit card authorization center that authorizes the transaction and provides indication of the transaction authorization to the content depository and distribution facility.

Further pursuant to an exemplary implementation, the content consumer further selects the distribution mechanism by way of which the content file is to be communicated to the content consumer. Communication by way of the Internet backbone, and other types of wireline distribution, a terrestrial-based wireless distribution, a satellite-based wireless distribution, or other distribution, is selectable by the content consumer by way of which to have the selected content file delivered. Pricing of the selected content is, if desired, dependent upon the selected distribution mechanism by way of which the content is to be delivered to the content consumer.

The content depository and distribution facility further includes apparatus 52 of an embodiment of the present invention. The apparatus 52 forms a revenue distributor and is formed of functional entities, implementable in any desired manner, such as by algorithms executable by processing circuitry. While, in the exemplary implementation, the apparatus 52 is embodied at the content depository and distribution facility, the entities of the apparatus are, in other implementations, embodied elsewhere or distributed amongst different locations of the system, or elsewhere, connectable to the facility 12 by way of appropriate communication links.

The apparatus 52 includes an includable entity identifier 54, a revenue allocator 56, an allocated revenue communicator 58, and a content distribution request detector 62.

Through operation of the apparatus 52, revenue allocations are made to allocate the revenue that is generated responsive to the requests for the content by the content consumers. Because the system 12 provides for the delivery of content directly thereto and, in turn, delivery of the requested content to a content consumer, the supply and distribution chain is smaller than that conventionally required to distribute content using conventional supply and distribution mechanisms. And, due to the structure of the system, revenue allocations need not be based upon a pre-ordained, fixed formulation. Rather, pursuant to operation of an embodiment of the present invention, dynamically selectable revenue allocations are made that permit efficient and equitable allocations of the revenue generated as a result of distribution of the content files to content consumers.

The includable entity identifier is coupled to receive inputs, here identified by way of the lines 66, that identify, for a particular content file 42, the identifications of entities that form possible revenue distribution parties to which revenues are allocable responsive to purchase, or other use of, a content file. The inputs identify, for instance, the content author, the content performer, the operators of distribution mechanisms, and the identity of the operator of the facility 12. And, the includable entity identifier identifies, from the possible revenue distribution parties and selected demand indicia, here represented to be provided to the identifier by way of the line 68, which, if any, of the possible revenue distribution entities are to be included in the revenue allocations.

The demand indicia, for instance, indicates when an entity is to be disincluded from the includable distribution entities. For instance, when the content author is lacking a commercial history, the content author is selectably disincluded from the revenue allocations. Analogously, when the content performer is without a commercial history, the content performer is selectably disincluded from the includable entities. And, the distribution mechanism is, for instance, selectably also disincluded from the includable entities, such as pursuant to a marketing campaign in which the distribution mechanism foregoes revenues for a limited period.

The revenue allocator allocates, amongst the includable entities, revenues that are generated pursuant to selection and downloading of selected content files responsive to requests for such downloading. Selected demand indicia, here represented by way of the line 72, is also provided to the revenue allocator, and the allocations made by the revenue allocator are further responsive to the contents of the demand indicia. The demand indicia, for instance, indicates the demand for the content. When the content is in high demand, the content author, or content performer, or both, selectably receive increased levels of revenue allocations. Conversely, when demand for the content is reduced, or if the content author or performer is lacking in historical commercial success, the revenue allocations to the performer or author, or both, is selectably reduced.

Revenue allocations allocated to the different ones of the includable entities are provided to an allocated revenue communicator 58. The allocated revenue communicator communicates to the appropriate entities, and selectably, also to the payment authorization center, the allocations, or monetary representations thereof, to facilitate effecutation of payment to the includable entities.

The content distribution request detector 62 operates selectably to identify when a content consumer requests downloading of a selected content file. In one implementation, detection by the detector initiates operation of the other entities of the apparatus 52.

Figure 2:
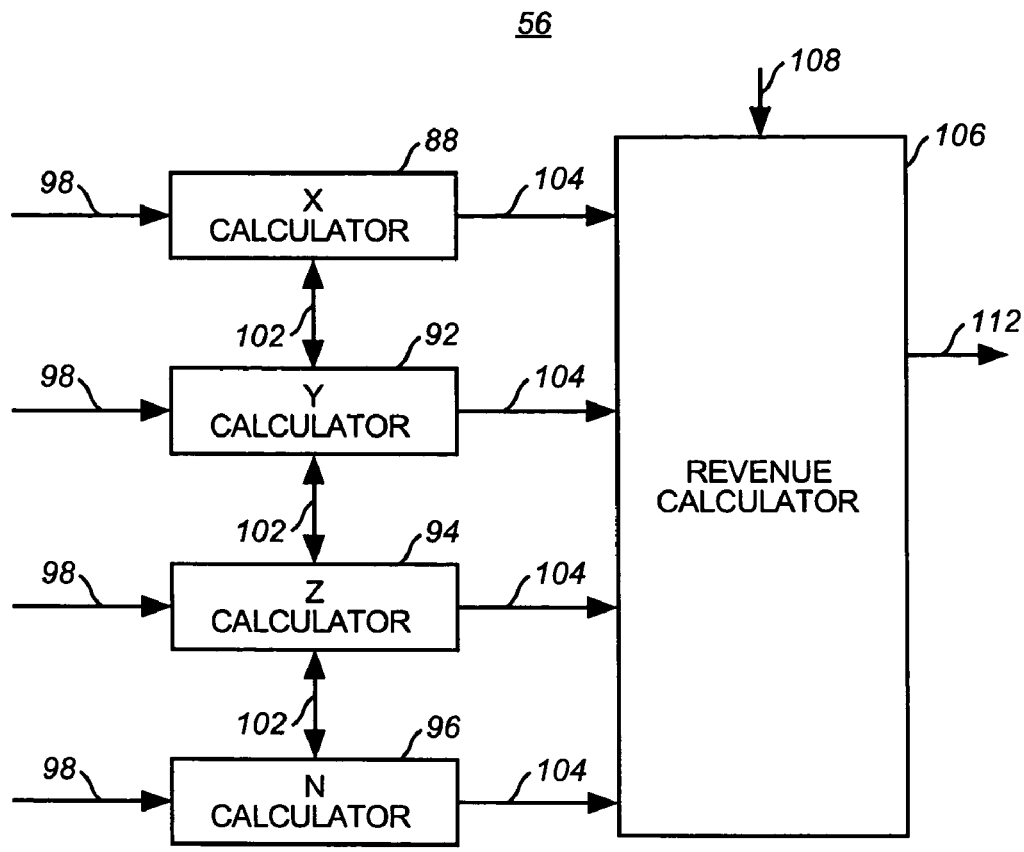
FIG. 2 illustrates a functional block diagram of an exemplary revenue allocator that forms a portion of the system shown in FIG. 1 and that operates pursuant to an embodiment of the present invention therein.

FIG. 2 illustrates a representation of the revenue allocator 56 that forms a portion of the apparatus 52 shown in FIG. 1. Here, the revenue allocator operates to calculate revenue allocations according to the following formula:

$$X(ca)+Y(cp)+Z(cd)+N(do)$$

Wherein:
  ca is the identity of the content authors;
  cp is the identity of the content performer;
  cd is the identity of the operator of the distribution mechanism that is used to distribute selected content; and
  do is the identity of the operator of the content depository and distribution facility.

Additionally, X+Y+Z+N=100%. That is to say, one hundred percent of the revenues that are generated are allocated to the includable entities, here the content author, performer, distributor, and depository operator. When other, or additional, entities form includable entities, the formula is correspondingly altered.

Separate calculations are formed to calculate the values of X, Y, Z, and N, here represented by the X calculator 88, the Y calculator 92, the Z calculator 94, and the N calculator 96. Inputs are provided to the calculators by way of the lines 98. And, the calculators are interconnected, indicated by the segments 102, so that the summation of the calculated values equals the one hundred percent distribution. Calculations made by the respective calculators are provided, by way of the lines 104, in this implementation, to a revenue calculator 106. The revenue calculator also receives, here by way of the line 108, indications of the actual revenues associated with downloading of a particular file. And, the revenue calculator operates to calculate the values of revenues on the lines 112 indicative of the revenues generated pursuant to the downloading of the content files.

Thereby, the allocations of revenue are made quickly, according to a quantitative and dynamically changeable formula. Increased efficiency of revenue allocations, as well as improved equities of allocations, are permitted.

Figure 3:
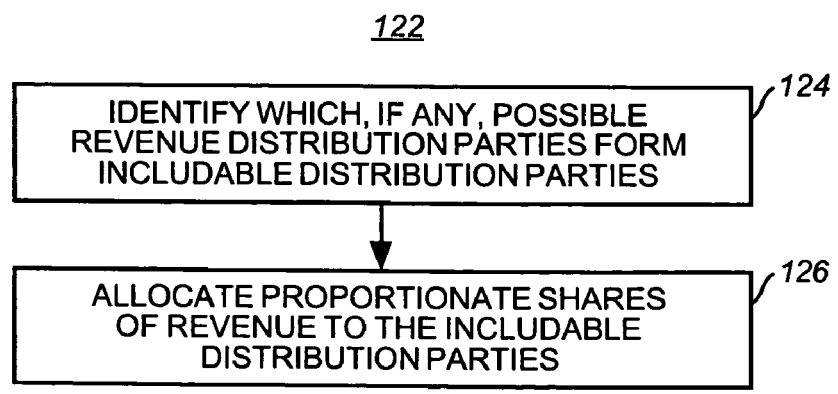
FIG. 3 illustrates a flow chart that represents the method of operation of an embodiment of the present invention by which to allocate revenues generated pursuant to distribution of content during operation of the system shown in FIG. 1.

FIG. 3 illustrates a method flow diagram, shown generally at 122, representative of the method of operation of an embodiment of the present invention. The method facilitates distribution of revenue generated pursuant to distribution of content files stored at a content distribution facility and available for distribution to content consumers.

First, and as indicated by the block 124, identification is made of which, if any, possible revenue distribution parties form includable distribution parties that are includable in distributions of revenue generated responsive to distribution of selected ones of the content files that are downloadable to a content consumer.

Then, and as indicated by the block 126, allocation is made amongst the includable distribution parties of proportionate shares of revenue that is generated pursuant to a proportionality scheme. The proportionality scheme is derived, at least in part, by at least a first selected demand indicia.

Thereby, through the use of the revenue distributor of an embodiment of the present invention, an improved manner by which to allocate revenues is provided. The distributor distributes allocations of revenue according to a dynamically changeable formula in a reduced supply and distribution chain permitted through use of a system, such as that shown in FIG. 1.

The previous descriptions are of preferred examples for implementing the invention, and the scope of the invention should not necessarily be limited by this description. The scope of the present invention is defined by the following claims.

What is claimed is:

1. A method for facilitating distribution of revenue generated pursuant to distribution of a content file available for distribution to a content consumer, said method comprising the operations of:

identifying an identity of a content author of the content file, an identity of a content performer of the content file, an identity of an operator of a distribution mechanism that distributes the content file, and an identity of an operator of a content depository and distribution facility that stores the content file;

allocating the revenues according to:

$X(ca)+Y(cp)+Z(cd)+N(do)$;

wherein:

$X+Y+Z+N=100\%$;

ca comprises the identity of the content author;
cp comprises the identity of the content performer;
cd comprises the identity of the operator of the distribution mechanism; and
do comprises the identity of the operator of the content depository and distribution facility.

2. The method of claim 1 further comprising the operation of requesting, by a selected content consumer, distribution to the content consumer of the content file.

3. The method of claim 2 further comprising the operations of submitting payment for the content file, and distributing the content file to the content consumer.

4. Apparatus for allocating revenues generated responsive to distribution of a content file to a content consumer, said apparatus comprising:

an identifier that selectably identifies an identity of a content author of the content file, an identity of a content performer of the content file, an identity of an operator of a distribution mechanism that distributes the content file, and an identity of an operator of a content depository and distribution facility that stores the content file; and an allocator adapted to receive indications of identifications made by said identifier, said allocator configured to allocate the revenues according to:

$X(ca)+Y(cp)+Z(cd)+N(do)$ wherein:

$X+Y+Z+N=100\%$;

ca comprises the identity of the content author;
cp comprises the identity of the content performer;
cd comprises the identity of the operator of the distribution mechanism; and
do comprises the identity of the operator of the content depository and distribution facility.

5. The apparatus of claim 4 further comprising a content distribution request detector, said content distribution request detector configured to detect a request for distribution to the content consumer of the content file, an indication of detection made by said content distribution request detector provided at least to said allocator.

* * * * *